Aug. 9, 1927.
W. J. BELCHER
1,638,388
POWER TRANSMISSION CHAIN
Original Filed Feb. 15, 1921    3 Sheets-Sheet 1
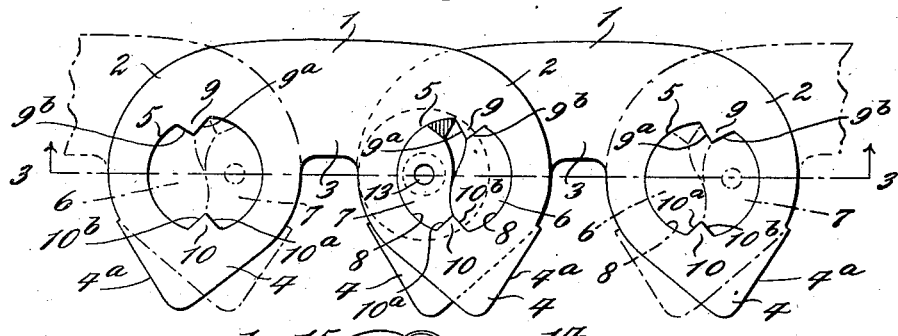
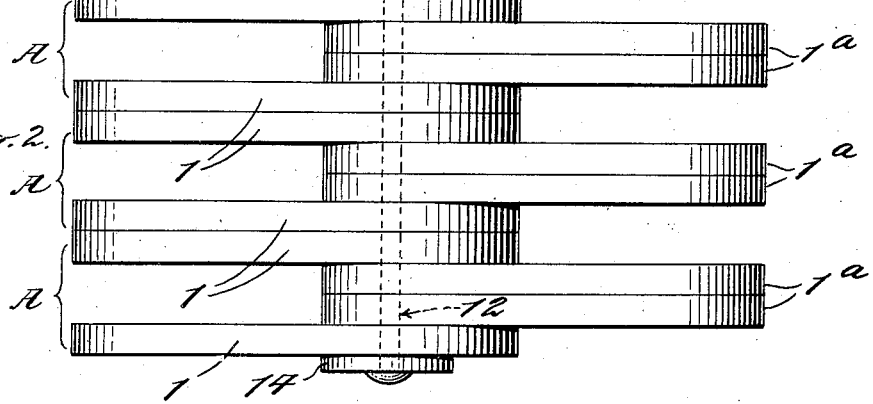
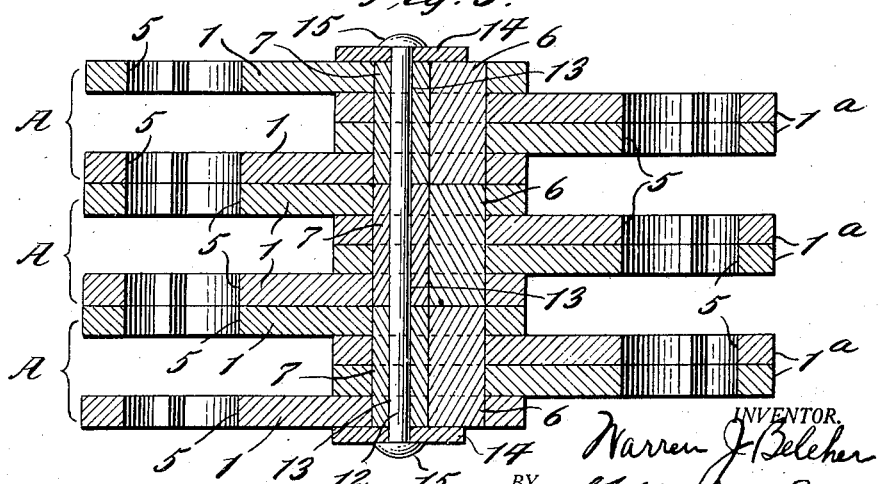

Aug. 9, 1927.
W. J. BELCHER
1,638,388
POWER TRANSMISSION CHAIN
Original Filed Feb. 15, 1921   3 Sheets-Sheet 2
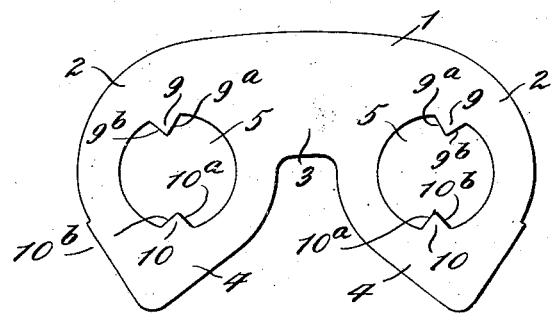
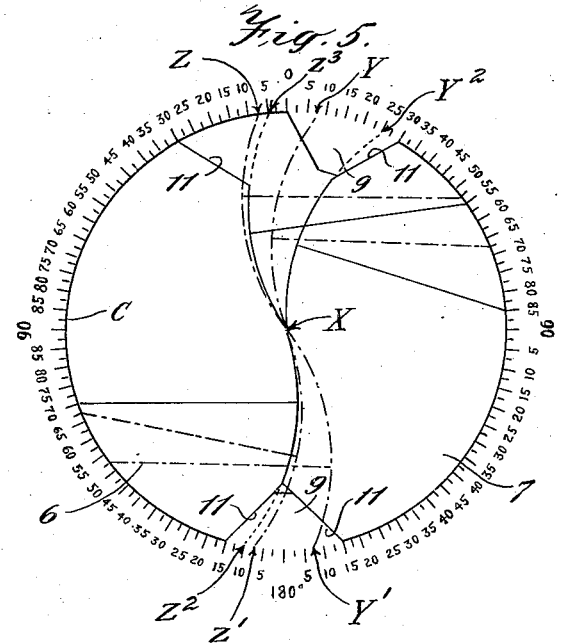

Aug. 9, 1927.
W. J. BELCHER
1,638,388
POWER TRANSMISSION CHAIN
Original Filed Feb. 15, 1921   3 Sheets-Sheet 3
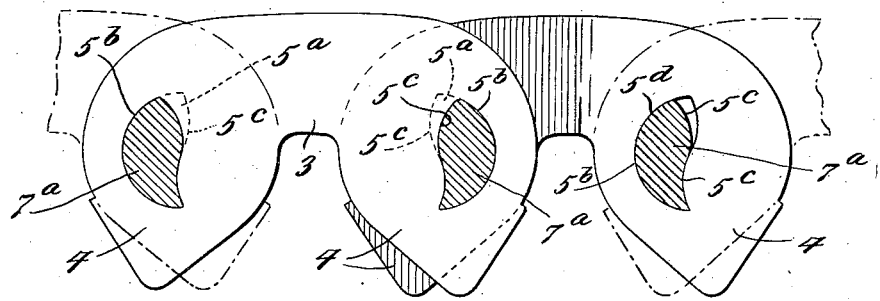
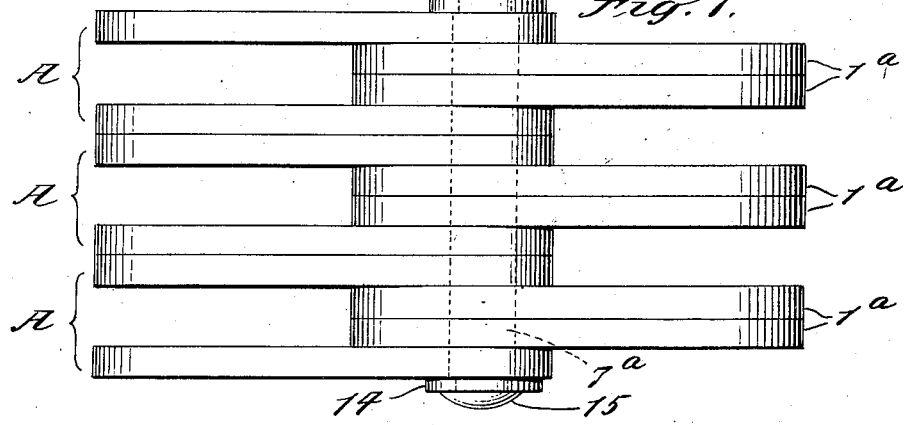
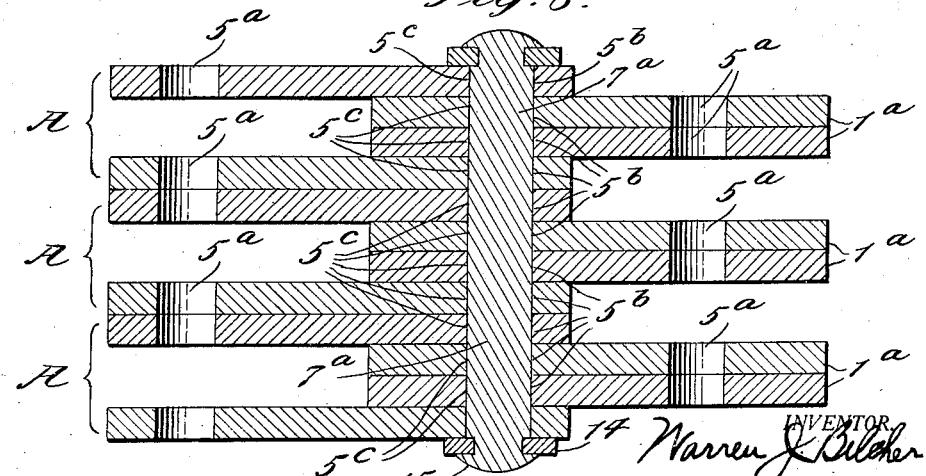

Patented Aug. 9, 1927.

1,638,388

UNITED STATES PATENT OFFICE.

WARREN J. BELCHER, OF HARTFORD, CONNECTICUT, ASSIGNOR TO THE WHITNEY MFG. COMPANY, OF HARTFORD, CONNECTICUT, A CORPORATION OF CONNECTICUT.

POWER-TRANSMISSION CHAIN.

Original application filed February 15, 1921, Serial No. 445,057. Divided and this application filed January 28, 1924. Serial No. 688,944.

My invention relates broadly and generally to new and useful improvements in power transmission chains, and more particularly to the type in which the chain is composed of toothed links consisting of toothed plates arranged with overlapping ends connected by transverse connecting means.

The object of the invention is to provide an improved chain in which the wear between the parts, and particularly that wear to which the transverse connecting means is subjected, will be reduced or prevented so as to prevent such lost motion between the parts which would result in lengthening of the chain to an objectionable degree.

The invention consists in the improvements to be more fully described hereinafter, and the novelty of which will be particularly pointed out and distinctly claimed.

I have fully and clearly illustrated my invention in the accompanying drawings to be taken as a part of this specification, and wherein:

Fig. 1 is a view in side elevation of a section of the chain embodying my invention;

Fig. 2 is a top plan view of the construction shown in Fig. 1;

Fig. 3 is a section on the line 3—3 of Fig. 1;

Fig. 4 is a view in side elevation of one of the link members or plates shown in the previous figures;

Fig. 5 is a diagrammatical view showing a method of determining the form and relation of certain contacting faces with connecting means forming part of the invention; and Figs. 6, 7 and 8 are views corresponding to Figs. 1, 2 and 3 and showing another embodiment of my invention.

Referring to the drawings by characters of reference, 1 designates a link member preferably in the form of a plate, including heads or end portions 2, 2 connected by an intermediate or arch portion 3, said heads having sprocket-engaging portions or members, preferably in the form of teeth 4, 4, having inclined side faces 4ª adapted to engage with the teeth of a driving or driven gear or sprocket (not shown). The chain is made up of a plurality of said plates or links arranged side by side in parallel planes, with the ends or heads 2, 2, thereof in overlapping relation, the ends being connected by transverse connecting means, to be described later, by which the chain links are pivotally connected and the chain completed. The chain may be made up of a plurality of chain units A (see Figs. 2 and 3), each of which consists of said outer link plates 1, and inner or intermediate plates 1ª, all of which may be of the same construction as shown, for example, three of such units may be used as shown in Figs. 2 and 3, and four as shown in Figs. 6 and 7.

The overlapping heads 2, 2 of the links in each unit are each provided with alining apertures 5, preferably circular in form as shown in Figs. 1 and 4, which apertures receive transverse connecting means connecting the link plates and permitting relative movement between the same. According to one embodiment of my invention, the connecting means comprises transverse connecting pins 6, 7, extending through said alining apertures, said pins being held in the apertures in said inner and outer plates, respectively, and having contacting faces in rolling contact.

The pins 6, 7 are arranged in movable contact with each other at their adjacent faces at a point approximating the center of the link apertures, that is, at the center of turning movement between the links, said faces being formed of curves providing for relative contact between the parts, and reducing wear to a minimum, so that the diameters of the pins are not reduced so as to result in lost motion between the bearing faces of the pins and consequent lengthening of the chain in use.

I have discovered that a most efficient construction for providing a substantial nonwearing contact between the pins is afforded by forming said faces, respectively, on ogee curves, so arranged as to provide proper extent of surface contact when the chain is moving in a straight line, and to permit proper relative movement between the pins to provide for the necessary pivotal or swinging movement between the links when the chain is passing about a sprocket or gear. In order to accomplish this, the contacting faces of the pins are formed on ogee curves passing through the center of the link aperture, the curves on adjacent faces of the respective pins or members above the center being designed so as to permit the curves on the adjacent faces of the respective pins below the center to engage substantially throughout the length of the latter faces below the center when the chain is pulling straight, and also to provide a space between the adjacent faces above the center for relative movement of the pins when the chain is curved as when passing about a sprocket or gear. The necessary amount of space between the upper adjacent curves depends upon the number of teeth in the sprockets over which the chain is designed to travel, that is, the space may be narrower relatively when the chain is to travel over large or many toothed sprocket wheels, but must be wider when used on sprocket wheels having less teeth or of a smaller diameter, for example, twelve teeth.

When the space is made wide enough to adapt the links to have the proper relative movement of the links upon the smallest sprocket wheel upon which the chain is adapted to be used, said space will obviously be correct for sprocket wheels of larger sizes upon which the same chain might be used. For example, if the space were made wide enough to permit proper relative movement in passing over a 12-toothed sprocket this space would be wide enough to provide the proper relative movement to permit the chain to flex properly when passing over larger sprockets, as the necessary extent of movement for the larger sprockets would fall within the limits of the space necessary to permit the chain to pass over a 12-toothed sprocket. In designing the curved faces on the pins between which the relative movement takes place, it is desirable to avoid as much as possible the formation of an abrupt or sharp contact or projection at the center of the chain. It is apparent that when the chain is used upon a 12-toothed sprocket, in which the teeth are spaced 30° apart, that such space must be provided for relative movement between the pins as will permit the pins to swing about their center a distance of 30°. It is also desirable to so design these curves that this space will be afforded, but, as stated, abrupt contact points will be avoided. A preferred form of the curved faces may be determined in the following manner, reference being particularly made to Fig. 5 of the drawings, in which the outer circle C corresponds to the circumference of one of the bores or openings through the ends of the links, and also to the outer circumferential faces of the pins, said circle, for purposes of explanation, being divided into spaces of 2½° and 5°, in order to make clear the manner of designing the faces of the pins. The vertical diameter of the circle is shown by a line passing from zero to 180°, on the scale, this line or diameter corresponding to a line drawn through the centers of the link apertures 5 at right angles to the length of the chain when traveling between sprockets. If the pins could be designed so as to have no line contact whatever at their centers, it would be necessary to form the engaging faces on a radius of a length equal to the radius of the circle, in which event, arcs struck through the zero point on the circumference and the center of the circle from the 60° point to the right of the zero point, and from a point 60° to the left from the lower end of the vertical diameter would be tangential to each other at the center of the circle, but it is clear that were the faces on both pins so formed, said faces would engage throughout their length, and one pin could not turn relative to the other without the link aperture 5. In order to approximate as near as possible the ideal form of contact face, just described, and at the same time provide for relative motion between the pins, I alter the relation of each member of the ogee curve on each pin, so that the proper contact will be provided when the chain is traveling between the sprockets, and the proper relative motion will be afforded when the chain is passing around a sprocket.

In order to do this, the upper convex face or curve of the ogee on the pin 7 is formed on an arc having a radius equal in length to the radius of the circle forming the external surface of said pins or the circumference of the opening 5, and with this radius I strike an arc from a point on the circumference of the circle 67½° to the right from the upper end of the vertical diameter, which arc will extend through the center of the circle at a point 7½° from the vertical, as indicated by the line X—Y, Fig. 5. In a similar manner I take a radius equal to the radius of the circle and strike an arc from a point on the circumference 52½° to the right from the upper end of the vertical diameter, and strike an arc which will pass through the center of the circle and through the circumference of the latter at a point 7½° to the left of the zero point or the upper end of the vertical diameter, as shown by the line X—Z, Fig. 5, whereby the curve of the concave face on the upper portion of the pin 6 is determined, the convex face on the pin 6 is determined by taking a center 67½° to the left of the vertical diameter at the bottom of the circle and scribing an arc passing through the center of the circle at a point on the circumference of the latter 7½° to the left of the lower end of the vertical diameter, as shown by the line X—Z'. The concave face on the pin 7 is formed by taking a radius equal to the diameter of the circle, and from a point on the circle 52½° to the left from the vertical scribing an arc passing through the center of the circle at a point on the circumference of the latter 7½° to the right from the lower end of the vertical diameter of the circle, as shown by the line X—Y'. It will thus be seen that the points at which the lines X—Z and X—Y pass through the circumference of the circle are spaced 15° apart, and the same is true at the point at which the lines X—Z' and X—Y' pass through the circumference of the circle, the total circumferential distance between said points being 30°, i. e., the distance required for relative movement between the faces of the pins when the links swing relative to each other in passing around a 12-toothed gear in which the teeth are spaced 30° apart. By this arrangement it will be seen that when the pins are placed in the apertures of the links, and the two faces XZ' and XY' are brought into contact throughout their lengths, there will be a space of 30° between the face XZ and XY. In arranging the pins in the completed chain, it is preferable to so arrange the line along which the faces of the curves XZ' and XY' meet, that when the chain is pulling straight the line along which these curves meet will be located as near as possible on a line perpendicular to the length of the chain; and for this purpose it is desirable to have the outer ends of these faces, or the line upon which these faces meet when the chain is pulling straight terminate, for example, 10° to the left of the vertical diameter of the circle, in which event, a line forming a continuation of the outer face XZ would terminate at a point on the circumference 5° to the left from the vertical, as indicated by the line X—Z³, and the face XY, if continued, would extend through a point on the circumference 25° to the right from the vertical diameter of the circle, as indicated by line X—Y².

In Figs. 6, 7 and 8 is shown another embodiment of the same invention, in which the novel contacting faces at the joint instead of being made on two coacting transverse members or pins, are made, respectively, on a wall of the opening in one of the links, and a pin or transverse member carried by the end of the overlapping link. As shown in these figures, one of the links is provided with openings 5ª corresponding to the openings 5, heretofore described, and each having a circular wall 5ᵇ arranged toward the end of the link, and an inner wall 5ᶜ formed, on an ogee curve, for example, like the curve X—Z³ and X—Z² (Fig. 5). This link may be the pin-carrying link. The overlapping link is provided with openings 5ᵈ similar to the openings 5ª, heretofore described, but arranged reversely, that is, with the circular walls innermost, and the ogee walls toward the ends of the link, these latter walls also having the same curvature as the wall 5ᶜ. This may be what is known as the pivoting link. When the chain links are assembled, the opening 5ª, for example, in the rear of its link, is arranged in alinement with the opening 5ᵈ in the forward end of the overlapping link, and the rear opening in the latter will be arranged in alinement with the forward opening in the next following pin link. The links are then secured together by a transverse member or pin 7ª, such as heretofore described, with the curved rear face thereof toward the curved walls of the alining openings 5ª and 5ᵈ, and with the concave-convex face of the pin opposed to the ogee curved faces in said alining openings 5ª, 5ᵈ, after which the pin may be secured in place against endwise movement, in any suitable manner. It will be understood that in this form the fixed curved faces carried by the links, and the curved faces on the connecting member are formed in the same manner as heretofore described, particularly with reference to Fig. 5. It will also be understood that the ogee faces on the walls of said openings and said connecting member are disposed relative to the center so as to give the proper swinging movement between the links in passing about a sprocket, the curve of the pin and the curve of the opening in which it is seated conforming to the curve XY²—XZ², while the curve in the opening in the link and in which the pin turns conforming to the curve XZ³—XZ².

This application is a division of my application Serial No. 445,057, filed February 15, 1921.

I claim:

1. A transmission chain having a plurality of overlapping links with registering openings having reversely curved walls and a single pin passing through the registering openings to form a rolling joint with said walls between the adjacent sets of links.

2. A transmission chain comprising a plurality of overlapping links with registering openings in the overlapping ends, said openings having a reversely curved wall, a single pin passing through said openings and having a reversely curved wall, and a clearance space between said pin and the walls of the openings in certain of the links whereby a rolling joint is formed between the links of adjacent pitches.

3. A transmission chain comprising a plurality of overlapping link plates having alining openings, a single transverse connecting member passing through the alining openings, said link plates having convex and concave surfaces on the walls around said openings cooperating with said transverse members to form rolling joints between the adjacent links of the chain.

4. A transmission chain comprising links consisting of overlapping link members, said link members having teeth arranged to form sprocket-engaging surfaces extending from side to side of the chain, a single pin member passing through registering openings in the overlapped ends of the links, said pin and the walls of the openings each having oppositely curved bearing surfaces in rolling engagement to form joints between the adjacent sets of links of the chain.

5. A transmission chain comprising link plates having overlapping ends with alining openings at the joints, a connecting member at each joint extending through said openings and having reversely curved surfaces, cooperating reversed curved surfaces on the links, said surfaces being in contact throughout a substantial portion of their area below the center line when the chain is running straight.

6. In a chain of the silent link type, a joint between adjacent sets of links comprising a single pin having an oblong cross section with reversely curved sides, said pin being thinner at its edges than the middle, the link openings having reversely curved walls engaging said pin and forming rolling contact therewith.

7. A transmission chain comprising link plates having overlapping ends with aligning openings, a single pin member extending through said openings, said pin and plates having cooperating ogee curves to form a joint.

8. A transmission chain comprising link plates having overlapping ends with aligning openings, a single pin member extending through said openings, said plates having ogee surfaces for cooperation with said pin to form a joint.

9. In a silent type chain, the combination of a plurality of overlapping links with registering openings, a single part pintle for the joints having convex and concave surfaces cooperating with like surfaces on the walls of the link openings, said cooperating surfaces being arranged to be in contact throughout a substantial portion of their area below the center line of the chain when the chain is under load between sprockets.

10. In a silent type chain, the combination of a plurality of links with registering openings, single part pintles for the joints having convex and concave surfaces cooperating with like surfaces on the walls of the link openings, said cooperating surfaces being arranged to be in contact throughout a substantial portion of their area, below the center line of the chain when the chain is under load between sprockets. and means for holding the pintles in a predetermined relation to the respective links.

11. In a silent type chain, the combination of a plurality of overlapping links with registering openings, single part pintles for the joints, said pintles having convex and concave surfaces, convex and concave surfaces on the walls of the link openings cooperating with said pintles and in contact therewith throughout a substantial portion of their area below the center line of the chain when the chain is under load between sprockets, whereby the elongation of the chain due to load is retarded.

WARREN J. BELCHER.